Nov. 5, 1929.    M. J. WOZNACK    1,734,243
DIRIGIBLE HEADLIGHT
Filed May 2, 1928    3 Sheets-Sheet 1

Inventor
M. J. Woznack
by Hazard and Miller
Attorneys

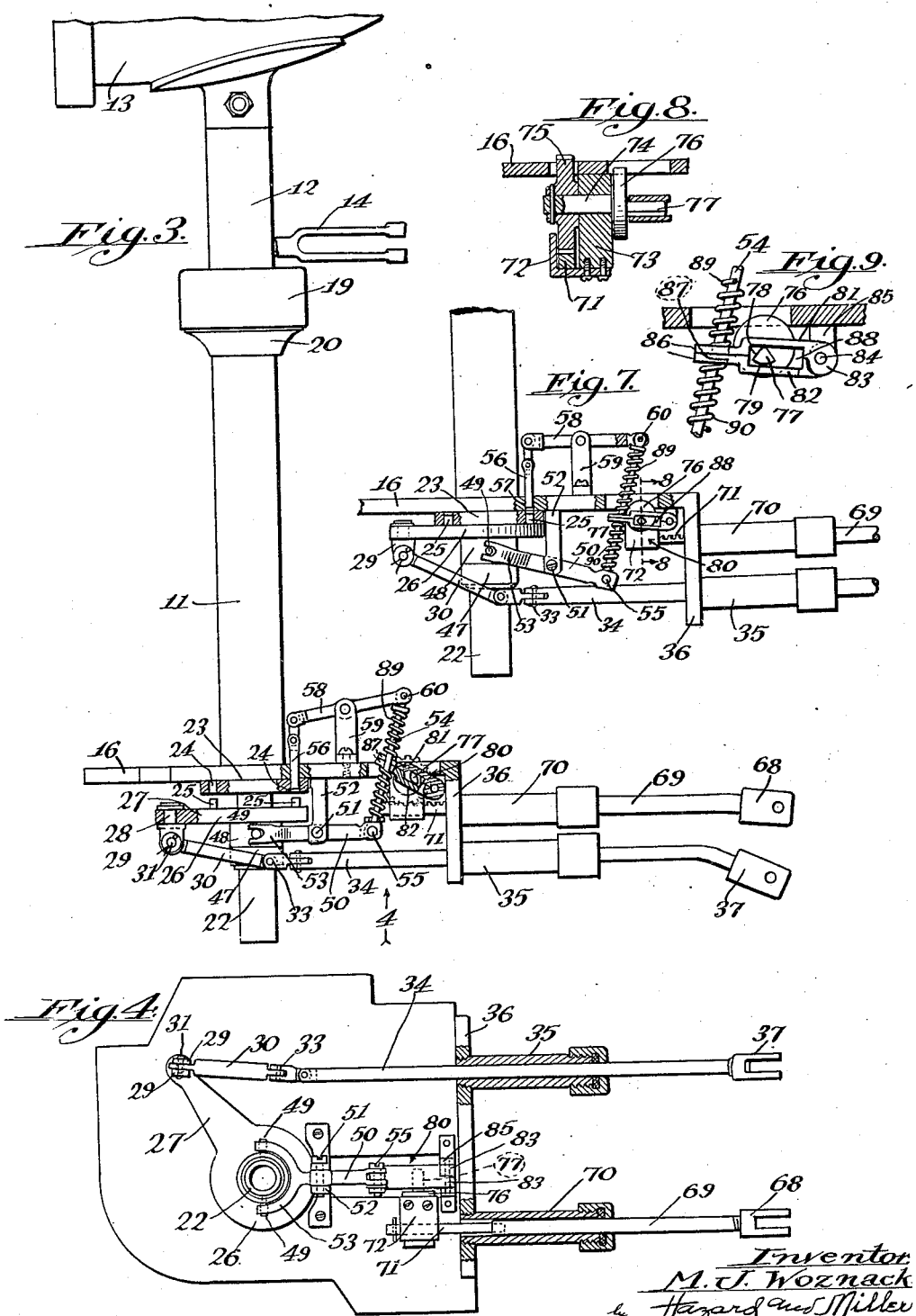

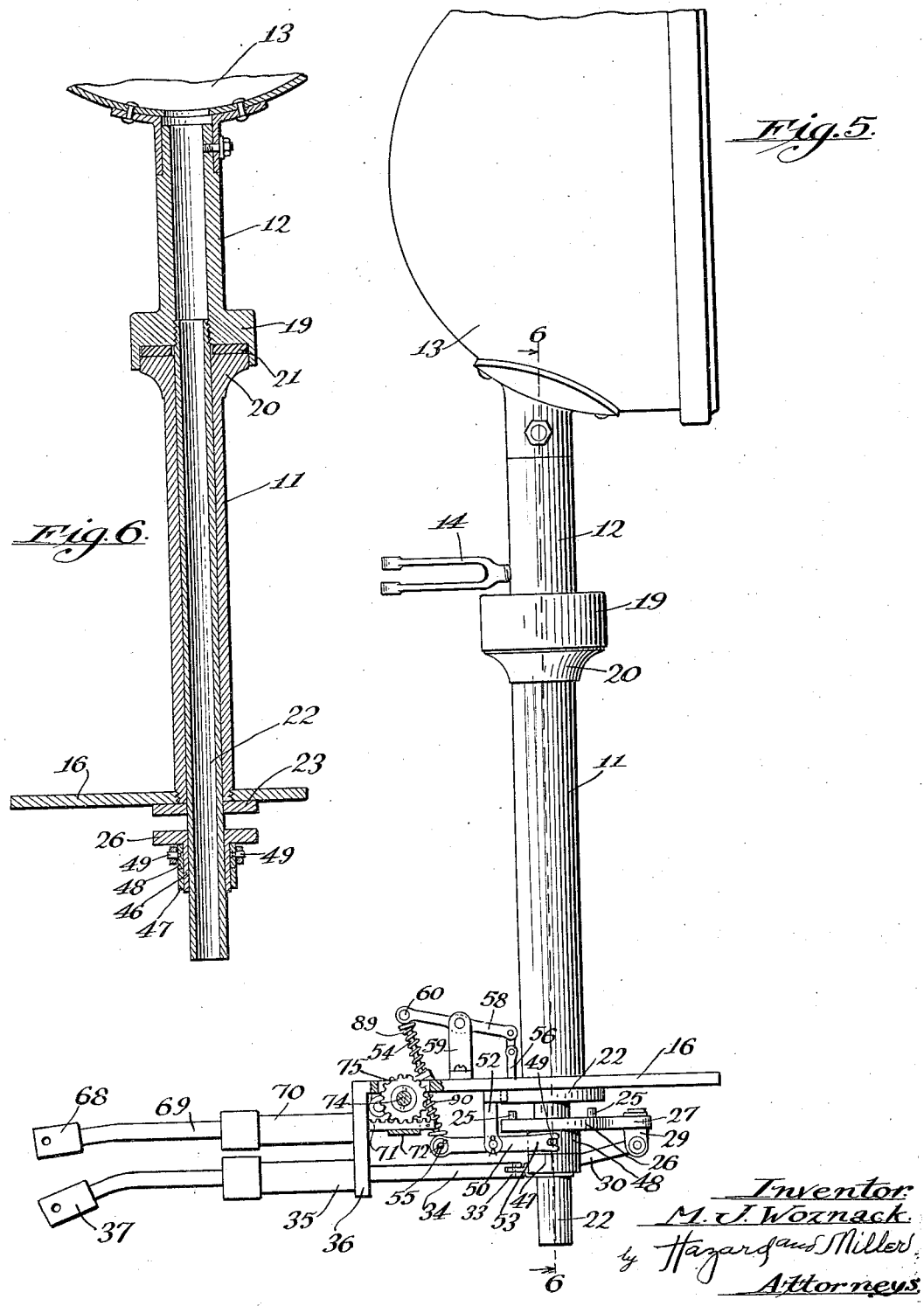

Patented Nov. 5, 1929

1,734,243

UNITED STATES PATENT OFFICE

MICHAEL J. WOZNACK, OF LOS ANGELES, CALIFORNIA, ASSIGNOR OF ONE-HALF TO STEPHEN WOZNACK, OF SAN FRANCISCO, CALIFORNIA

DIRIGIBLE HEADLIGHT

Application filed May 2, 1928. Serial No. 274,469.

My invention is a headlight turning mechanism for automobiles.

An object of my invention is in a turning mechanism for headlights for automobiles, that is in so-called dirigible headlights, to provide an arrangement by which the headlights may be locked in a stationary position to throw a light beam straight ahead or may be engaged to the movement providing mechanism giving a dirigible light to follow the turns in driving.

In brief, with my mechanism the lights may be locked in stationary position for daylight travel and may be unlocked or used as dirigible lights for night travel.

A further object of my invention is the use of a centering lock which may be utilized to center the headlights in a straight ahead position; and in combination with this I provide a clutch which interacts with the lock so that when the headlights are in a locked position the clutch is in an open position and when the headlights are unlocked the clutch is in an engaged position to allow for the dirigible movement of the headlights.

A further detailed object of my invention is the manipulation of the lock and the clutch by pedal operating devices in the floor of a driver's compartment so that he may readily shift the headlights from a fixed position to a dirigible operation or vice versa.

A further object of my invention is the linking of the headlights with a moving part of the steering mechanism and with one element of the clutch so that when the clutch is open the steering mechanism in its operation does not shift the headlights, but if the clutch is engaged and the lock open the headlights are turned in a dirigible manner.

A further object of my invention is the interlinking of the clutch with the steering mechanism and with the lock so that if the clutch is operated to shift from an open to a closed position when the vehicle is not centered for straight ahead driving that the headlights will not be engaged by the dirigible mechanism, and this will only start to function when the vehicle is in position for a straightway line of travel, then the clutch is closed and the headlights become unlocked.

Figure 1:
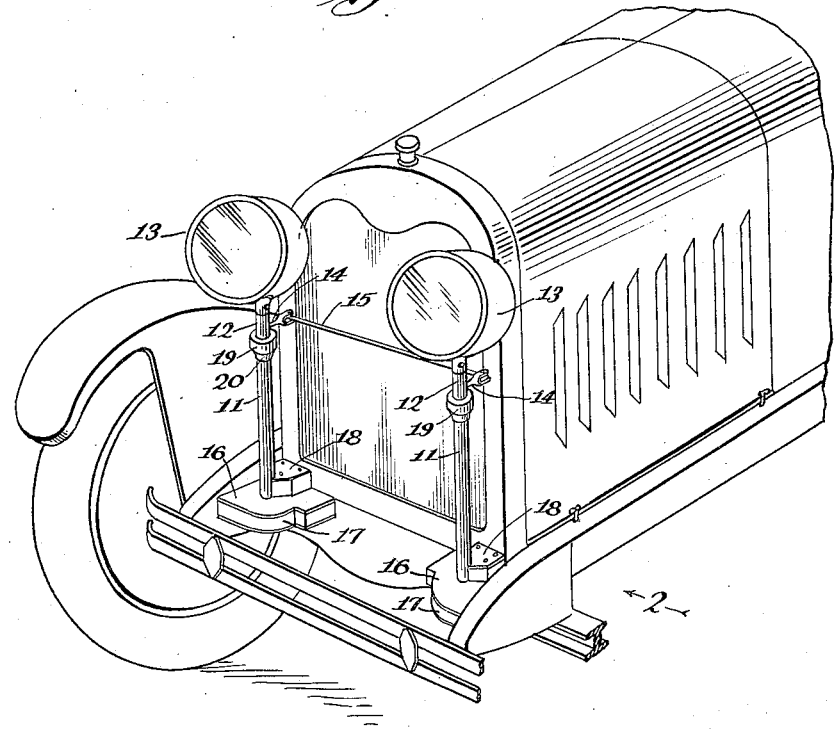
Figure 2:
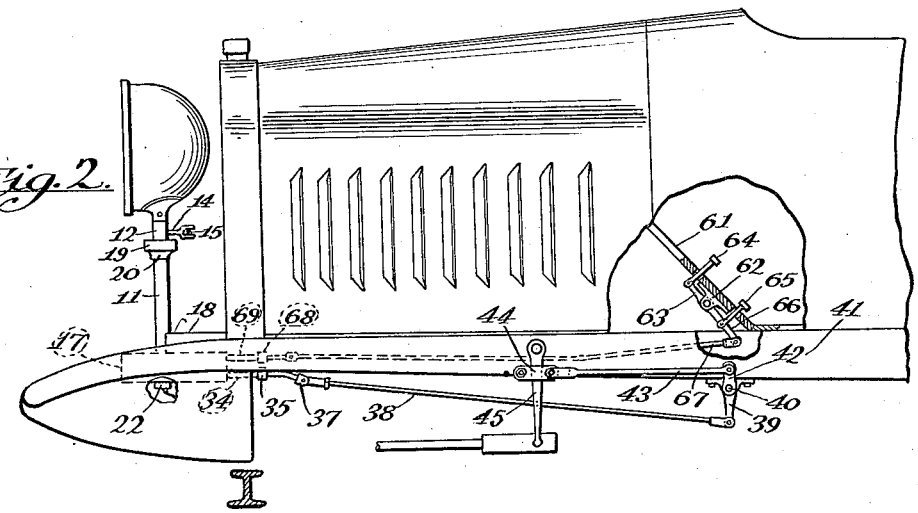

My invention in its various aspects will be more readily understood from the following description and drawings, in which:

Fig. 1 is a perspective view showing the installation of my headlights,

Fig. 2 is a side elevation partly broken away, taken in the direction of the arrow 2 of Fig. 1, Fig. 3 is a side elevation showing the mounting for one of the headlights and the turning mechanism therefor, Fig. 4 is a bottom view taken in the direction of the arrow 4 of Fig. 3, Fig. 5 is a side elevation taken in the opposite direction of that of Fig. 3, Fig. 6 is a vertical transverse section taken on the line 6—6 of Fig. 5 in the direction of the arrows, Fig. 7 is a detailed elevation of part of the operating mechanism shown in Fig. 3 in another position, Fig. 8 is a detailed vertical transverse section on the line 8—8 of Fig. 7 in the direction of the arrows, Fig. 9 is a detailed side elevation showing part of the turning cam for controlling the lock and the clutch on a larger scale than Figs. 3 and 7.

Referring first to Fig. 1, a pair of tubular standards 11 are illustrated as mounted in the front of the vehicle and in each of these standards there is a rotatable shaft 12 on which is mounted the headlights 13. Each of the shafts has an arm 14 connected thereto with a link 15, so that only one of the headlights needs to be turned by the mechanism hereunder described and the other is shifted in synchronism therewith.

The standards are connected to base plates 16 which have covering molding 17 depending therefrom enclosing part of the mechanism and hereunder described; and above these base plates there is a housing 18 enclosing part of the mechanism described in detail hereunder. It will be seen therefore that the headlights and the above mentioned structure may be accommodated in a neat manner in front of the radiator of the vehicle.

The turning mechanism for the headlights is constructed substantially as follows, having reference particularly to Figs. 3 through 6. The shaft 12 of one of the headlight structures is illustrated as having an enlarged bearing structure 19 which fits on a cap 20 with a bearing ring 21 therebetween, the cap being at the top of the standard 11. An operating shaft 22 is secured to the shaft 12 and extends downwardly below the base plate 16. (Note Fig. 6).

A clutch collar 23 is fixedly secured to the operating shaft 22 and has a pair of perforations 24 therein which are adapted to be engaged by pins 25 on a slidable clutch collar 26. This latter clutch collar has an arm 27 extending laterally therefrom with a pivot pin 28 secured to such arm. Lugs 29 extend upwardly from the pin and form a connection for a link 30 by means of a cross pin 31. This link is connected to a universal joint 33 and such joint is connected to the forward end of a slidable rod 34 which operates through a guide tube 35 secured to a downwardly extending flange 36 of the base plate 16.

The rear end of the rod has a connector 37 to which is attached a rod 38, this latter being attached at its rear end to a rock arm 39 mounted on a rock shaft 40 supported from the frame 41 of the vehicle. This rock shaft has a second rock arm 42 with a link 43 connected thereto. Such link has a clamp 44 in the front portion which is attached to a steering mechanism rock arm 45.

Presuming that the clutch collars are engaged as illustrated in Fig. 7, then due to the operation of the steering mechanism which rocks the arm 45 the headlights are partly rotated on their vertical shafts conformably to the movement of the steering wheels.

The clutch operating mechanism is as follows, referring particularly to Figs. 3 through 7: The clutch collar 26 has a sleeve 46 connected thereto, this having a sliding fit on the operating shaft 22, and on the lower end of this sleeve there is a fixed ring 47 and between the ring 47 and the collar portion 26 there is a rotatable ring 48 having studs 49 extending outwardly therefrom diametrically opposite.

A clutch lever 50 is mounted on a pivot 51 supported from a bracket 52 depending from the base plate 16. This lever has a yoke 53 at one end engaging the studs 49. The opposite end of the lever is connected to a rod 54 by a pivotal connection 55. It will therefore be seen that when this rod 54 is operated in an up-and-down direction it swings the clutch lever 50 and thus raises or lowers the clutch collar 26.

The headlight locking mechanism is substantially as follows, referring particularly to Figs. 3, 5 and 7: A bolt 56 is slidably mounted in a perforation 57 in the base plate and is adapted to fit in one of the perforations 24 of the clutch collar 23. The upper end of this bolt is pivotally connected to a lock actuating lever 58 journaled on a bracket 59 extending upwardly from the base plate 16. The rear end of this lever has a pivotal connection 60 with the rod 54. It will thus be seen that when the rod 54 is actuated in an up-and-down direction it actuates the lever 58 thus raising and lowering the bolt 56.

The actuating mechanism for the rod 54 to control the lock and lower the clutch is substantially as follows, having reference particularly to Figs. 2, 3, 4, 5, 7, 8 and 9: In Fig. 2 part of the floor boards of the driver's compartment are indicated by the numeral 61 and have a bracket 62 mounted underneath on which is mounted a rock lever 63. This lever has a pair of stems 64 connected thereto with foot pedals 65 on the upper end, the stems operating through holes in the floor boards. The lever has an extension 66 to which is pivotally connected a link 67 leading forwardly. This link connects to a connector 68 on the sliding rod 69 slidable in a guide tube 70 secured to the flange 36 depending from the base plate 16. (Note particularly Figs. 4 and 5). The rod 69 has a rack 71 at its forward end, this rack being guided on an angle plate 72 secured to a stud 73 attached to the under side of the base plate 16. This stud forms a journal for an oscillating shaft 74. (Note Fig. 8).

On one end of this shaft there is a pinion 75 meshing with the rack 71 and on the other side there is a disc 76. This disc has a cam pin 77 mounted thereon. The pin has two flat surfaces 78 joined by the curved surface 79. (Note Fig. 9).

A cam actuated lever 80 (note Figs. 3, 7 and 9) is formed of an upper section 81 and a lower section 82, each of these having hubs 83 mounted on a pivot pin 84 secured to a bracket 85 depending from the base plate 16. The opposite ends 86 of these sections have adjoining faces and are provided with perforations 87 through which the rod 54 operates. This structure forms a slot 88 in which the cam pin 77 fits and operates. There are two springs 89 and 90 connecting respectively between the ends 86 of the cam actuated lever 80 and the end of the lever 50 opposite the yoke 53 and the end of the lever 58 opposite the bolt 56. These springs are coiled on the rod 54.

The method of operation of the actuating mechanism for the rod 54 controlling the lock and the raising and lowering of the clutch is as follows: When the device is in the position of Fig. 3 the headlights are locked in a position to throw the beam of light directly ahead of the vehicle, and in such position the clutch is in the open position, the lower clutch collar being in its lowermost position. Hence, when the vehicle is turned in either direction the lower collar 26 may partially rotate on the operating shaft 22 without turning this shaft, and when in this position the upper foot pedal 65 is depressed so that the link 67 and the slide rod 69 are drawn back to their full limit thus drawing the rack 71 into its rearwardmost position. When the lower foot pedal 65 is depressed the link 67 and the slide rod 69 with the rack 71 are forced forwardly. This action rotates the pinion 65, hence the shaft 74, the disc 76 and the cam pin 77 are rotated in a clockwise direction as viewed in Figs. 3, 7 and 9.

In the unlocked position it will be noted that one of the faces 78 of the cam pin rests on a flat surface of the cam actuated lever 80 and that when this pin is shifted to the position shown in Figs. 7 and 9 the curved surface 79 bears on the same surface of the cam actuated lever, thus depressing this lever from the position of Fig. 3 to that of Figs. 7 and 9. This action causes a compression of the spring 89 which forces downwardly on one end of the lever 50 thus moving the yoke 53 upwardly and raising the moving clutch collar 26 to its uppermost position. On account of the rod 54 connecting the levers 50 and 58 this latter lever is rocked, raising the bolt 56 and unlocking the clutch collar 23. Therefore, this collar is free to rotate with the collar 26 and thus through the medium of the operating shaft 22 and the shaft 12 turn the headlights.

Presuming that when the lower pedal 65 is operated that the vehicle is being turned, then the pins 25 will not engage in the perforations 24, nor will the bolt 56 be withdrawn, but as soon as the course is straightened out so that the wheels are lined up for straight ahead travel the clutch will shift to the closed position, the bolt 56 being withdrawn.

In the reverse operation the steering wheels must be turned to the position for straight ahead travel so that when the upper pedal 65 is depressed and the rack 71 drawn rearwardly giving the cam pin 77 a motion contraclockwise as viewed in Figs. 3, 7 and 9, the clutch is open by lowering the collar 26 and the bolt 56 is drawn into the perforation 24 in the collar 23, thus locking the headlights throwing a beam of light straight ahead. As the two headlights are connected to work in synchronism by the link 15 it is only necessary to connect one of the headlights to the steering mechanism and to the foot pedal control for the clutch and bolt.

It will therefore be seen by my invention that the headlights may be maintained in a position for straight ahead beams or locked in this position for daylight travel; and to effect a dirigible beam the foot pedal device only need be operated to engage the clutch and unlock the headlight, whence a dirigible beam is obtained following the turning motion of the steering wheels.

It will be noted by my construction that the slidable clutch collar 26 which is connected to the steering mechanism only makes a partial turn and never becomes reversed in the steering of the vehicle. Also by my construction the headlights can only be locked in a position in which they project the light straight ahead and hence the headlights can only be coupled to the steering mechanism when such steering mechanism is in the direction for straight line travel.

The device likewise can only be disengaged from the steering mechanism when the steering mechanism and the headlights are in the position for straight line travel, as it is necessary for the clutch pins 25 to be withdrawn at substantially the same time that the locking bolt 56 is inserted in one of the perforations 24 in the clutch collar 25 secured to one of the headlights. Should the attempt be made to disconnect the headlights when the vehicle is making a turn or the steering wheels in the position to make a turn, the opening of the clutches will be prevented as the slidable clutch collar 26 cannot be disengaged from the clutch collar 23 until the bolt 56 can be thrust into one of the perforations 24. Therefore there is no danger of the accidental disconnection of the headlights when the vehicle wheels are not in a position for straight line travel.

Another characteristic feature of my invention is that the clutch is closed and the headlights unlocked and also the clutch is opened and the headlights locked by a resilient type of action, that is, the springs 89 and 90 become compressed by the operation of the lever 80. The compression of the springs operating either the clutch lever 50 or the lock actuating lever 58. This resilient or spring action gives a quick movement to the operation of a sliding clutch collar 26 and of the bolt 56.

Various changes may be made in the principles of my invention without departing from the spirit thereof, as set forth in the description, drawings and claims.

I claim:

1. In combination with a headlight of a vehicle, a tubular standard connected to a base, an operating shaft rotatably mounted therein and connected to a headlight, a clutch having a fixed clutch collar secured to the operating shaft, a second clutch collar slidable and rotatable on the shaft, a connecting means from the second clutch collar to the steering mechanism of the vehicle to rotate said collar, a clutch opening and closing mechanism to engage and disengage said collars, an operating rod connected to the driver's compartment and having a rack, a pinion operated by said rack, and a cam operated connection from the pinion to the opening and closing mechanism of the clutch.

2. In combination with a headlight of a vehicle as claimed in claim 1, the standard being mounted on a base and having a perforation therein to align with a perforation in the first clutch collar, a slidably mounted bolt, and means interconnected with the pinion to operate said bolt.

3. In combination with a headlight of a vehicle, a clutch having a first element connected to the headlight, a second rotatable and slidable element connected to a part of the steering mechanism, an operating rod controlled from the driver's compartment and having a rack thereon, a pinion meshing with the rack driving an oscillating shaft, a cam pin rotated by said shaft, a pivotally mounted cam actuated lever operated by the cam, a rod interconnected to said lever, a connection from said rod to the second clutch element to slide said element to close and open the clutch.

4. In combination with a headlight of a vehicle as claimed in claim 3, a slidably mounted bolt positioned to engage the first clutch element and operated by the rod operating the second clutch element.

5. In combination with a headlight of a vehicle as claimed in claim 3, the second clutch element having an operating lever connected to the rod which engages the cam actuated lever, a second lever pivotally mounted and having a bolt connected thereto to engage the first clutch element, and springs on the rod between the cam actuated lever and the first and second levers.

6. A headlight turning mechanism for automobiles having a headlight and a clutch, one element of the clutch being connected to the headlight, another element being connected to a steering mechanism, means operated under control of a driver to engage the clutch element connected to the steering mechanism to the clutch element connected to the headlight, whereby the headlight may be turned on steering the vehicle, a lock engaging the clutch element connected to the headlight, means to unlock said connection on engaging the clutch elements, said lock preventing unlocking of the clutch elements unless the steering mechanism is in a position for straight ahead travel and said lock engaging the clutch element of the headlight on disengaging the clutch element connected to the steering mechanism.

7. A headlight turning mechanism comprising in combination a headlight, a steering mechanism, a clutch having one element thereof connected to the headlight and the other element connected to the steering mechanism, means to slide at least one of said elements to close and open the clutch, a lock positively engaging the clutch element connected to the headlight and retaining said headlight in a predetermined position with the clutch open, means to operate the clutch element connected to the steering mechanism to close the clutch and at the same time unlock the lock operating the clutch element connected to the headlight, whereby the headlight may be turned with the steering mechanism, the said lock engaging part of the clutch element connected to the headlight on an attempt being made to open the clutch when the steering mechanism is out of position for straight line movement of the vehicle, and said lock locking the clutch element connected to the headlight only when the steering mechanism is in a position for straight line travel and the headlight in a predetermined position, means interengaging the clutch element connected with the steering mechanism and the lock to operate said element to close the clutch and to unlock the headlight and to lock the headlight and open the clutch in a simultaneous operation.

8. A headlight turning mechanism comprising in combination a headlight, a steering mechanism, a clutch having a first clutch element connected to the headlight and a second clutch element connected to the steering mechanism, a slidable locking bolt engaging the first clutch element, means to slide at least one of the clutch elements to close the clutch and simultaneously therewith sliding the bolt to unlock the first clutch element, said bolt preventing the opening of the clutch until the steering mechanism is in position for straight line travel and the headlight in a predetermined position, the opening of the clutch by operation of the clutch elements simultaneously, locking the bolt to the first clutch element.

9. A headlight turning mechanism as claimed in claim 8, a resilient device connected to the movable clutch element and to the bolt, and a lever controlled by the driver of the vehicle to operate such resilient device.

10. A headlight turning mechanism comprising in combination a headlight having a first clutch collar connected thereto with perforations, a steering mechanism having a second clutch collar slidably mounted, having pins to engage the said perforations, a slidable bolt operated to engage a perforation of the first clutch collar, the clutch collars forming a clutch, a clutch operating lever connected to the second collar, a lock operating lever connected to the bolt, a link connecting said levers, and means controlled by the driver of a vehicle to actuate said levers simultaneously, whereby the clutch may be closed and the bolt unlocked or the clutch opened and the bolt bolted into locking position, the said link having springs connected thereto and a lever engaging said springs, the lever being under control of the driver of a vehicle.

11. A headlight turning mechanism comprising in combination a headlight having a first clutch collar with perforations, a steering mechanism having a second clutch collar with pins, the clutch collars forming a clutch, a bolt slidably mounted to engage one of the perforations of the first collar and lock such collar, a device having springs operatively connected to the second clutch collar and to the bolt, a pivoted lever actuating said springs, a pinion to operate said lever, a rack to operate the pinion and means to shift the rack under control of the vehicle driver, the closing of the clutch unlocking the first collar and the opening of the clutch locking such collar.

12. In combination with the steering mechanism of a vehicle, a headlight means for mounting said headlight for a horizontal swinging movement, operative means between the headlight and the steering mechanism of the vehicle for swinging the headlight as the steering mechanism is actuated, a clutch interposed between said operative means and the steering mechanism for optionally connecting the headlight supporting means with the steering mechanism, simultaneously operating means for locking the headlight supporting means in an immovable position when said clutch is disengaged, a control lever adapted to be manually operated for controlling the operation of said clutch and said locking means, and yieldable means operated by said lever for alternately urging the clutch and the locking means into engagement with the light supporting means adapted to cause the members to come into register with each other when in their proper relation and after the control lever has been operated.

13. In combination with a dirigible headlight for automobiles, a shaft adapted to support the headlight, a first clutch member fixed to said shaft, a second clutch member freely movable upon said shaft, means for connecting said second clutch member with the steering mechanism of the automobile, a member for locking said first clutch member and said shaft against movement, means operating to alternately move said second clutch member into engagement with said first clutch member and said locking member into locking engagement with said first clutch member, a lever for controlling the operation of said last means, and yielding connections co-operating with said operating lever for urging both said second clutch member and said locking member into engagement with said first clutch member when the parts come into register after the operation of said lever.

In testimony whereof I have signed my name to this specification.

M. J. WOZNACK.